(12) United States Patent
Fried

(10) Patent No.: US 7,422,120 B1
(45) Date of Patent: Sep. 9, 2008

(54) COLANDER BOWL AND SERVER

(76) Inventor: Brian Fried, 9 Richbourne La., Melville, NY (US) 11747

( * ) Notice: Subject to any disclaimer, the term of this patent is extended or adjusted under 35 U.S.C. 154(b) by 265 days.

(21) Appl. No.: 11/428,476

(22) Filed: Jul. 3, 2006

(51) Int. Cl.
*B01D 35/28* (2006.01)
*A47J 43/22* (2006.01)
*A47J 43/24* (2006.01)

(52) U.S. Cl. ........................ 210/464; 210/465; 210/471; 210/473; 210/474; 99/495; 99/508; 220/607; 220/676

(58) Field of Classification Search ........................ None
See application file for complete search history.

(56) References Cited

U.S. PATENT DOCUMENTS

| | | | | |
|---|---|---|---|---|
| 3,091,339 A | * | 5/1963 | Marra et al. | 210/232 |
| 3,300,048 A | * | 1/1967 | Pollock | 210/232 |
| D315,478 S | * | 3/1991 | Liggens | D7/667 |
| 5,064,535 A | * | 11/1991 | Hsu | 210/380.1 |
| D424,381 S | | 5/2000 | Terenzio | |
| D425,378 S | | 5/2000 | Gilbertson | |
| 6,135,307 A | * | 10/2000 | Fahy | 220/574 |
| 6,329,004 B1 | * | 12/2001 | Fernandez | 426/243 |
| 6,443,313 B1 | * | 9/2002 | Uli | 210/470 |
| 6,949,190 B2 | | 9/2005 | Hutzler | |
| 7,025,213 B2 | * | 4/2006 | Chen | 210/474 |
| 2005/0205487 A1 | | 9/2005 | Rogers | |

FOREIGN PATENT DOCUMENTS

GB 2376425 12/2002

* cited by examiner

*Primary Examiner*—Krishnan S. Menon
*Assistant Examiner*—Madeline Gonzalez
(74) *Attorney, Agent, or Firm*—Sturm & Fix LLP

(57) ABSTRACT

The present invention provides a colander serving bowl having an outer shell with an open bottom, a movable sealing plate with upwardly extending support arms that ride on inclined surfaces on the rim of the outer shell, and a perforated inner shell supported on the sealing place. The sealing plate is movable between a lowered sealing position where the plate seals the open bottom of the outer shell, and a raised draining position where the plate is spaced above the open bottom to allow draining through the open bottom. As the support arms are moved, the support surfaces of the arms move from the lower end to the upper end of the inclined surfaces of the rim, thus moving the sealing plate from the sealing position to the draining position.

8 Claims, 2 Drawing Sheets

COLANDER BOWL AND SERVER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of kitchen utensils, and more particularly to a colander serving bowl.

2. Description of Related Art

Colanders are kitchen utensils with perforations for draining off liquids and rinsing food. A person cooks pasta and then drains out the water and puts the colander on the kitchen counter, serves the pasta on plates and leaves sticky pasta runoff to drip all over the counter, or sometimes it is left on the kitchen table to be served from. When the colander is used, the water takes time to fully drain and people do not always have time to wait for the water to drain out completely. What happens is the left over water slowly drips out onto the table or counter top surface the colander is placed on. Usually, the colander is used to drain the liquid into a sink and then the dishes have to be brought over to the colander in the sink for serving, or the colander is placed on the surface and allowed to drip to be cleaned up later.

As can be seen by reference to the following U.S. Pat. Nos. D424,381; D425,378; 6,949,190; U.S. Publication No. 2005/0205487; and UK Patent Application No. 2 376 425, the prior art is replete with myriad and diverse colander bowl and serving bowl combinations.

While all of the aforementioned prior art constructions may be adequate for the basic purpose and function for which they have been specifically designed, they are uniformly deficient with respect to their failure to provide simple, efficient, and practical colander serving bowl.

As a consequence of the foregoing situation, there has existed a longstanding need for a new and improved colander serving bowl and the provision of such a construction is the stated objective of the present invention.

BRIEF SUMMARY OF THE INVENTION

Briefly stated, the present invention provides a colander serving bowl having an outer shell with an open bottom, a movable sealing plate with upwardly extending support arms that ride on inclined surfaces on the rim of the outer shell, and a perforated inner shell supported on the sealing plate. The sealing plate is movable between a lowered sealing position where the plate seals the open bottom of the outer shell, and a raised draining position where the plate is spaced above the open bottom to allow draining through the open bottom. As the support arms are moved, the support surfaces of the arms move from the lower end to the upper end of the inclined surfaces of the rim, thus moving the sealing plate from the sealing position to the draining position.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
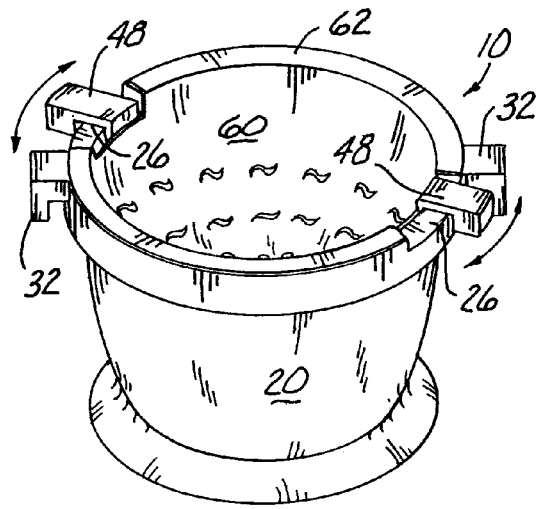
FIG. 1 is a perspective view of the colander serving bowl of the present invention.

As can be seen by reference to the drawings, and in particular to FIG. 1, the colander serving bowl that form the basis of the present invention are designated generally by the reference number 10.

Figure 2:
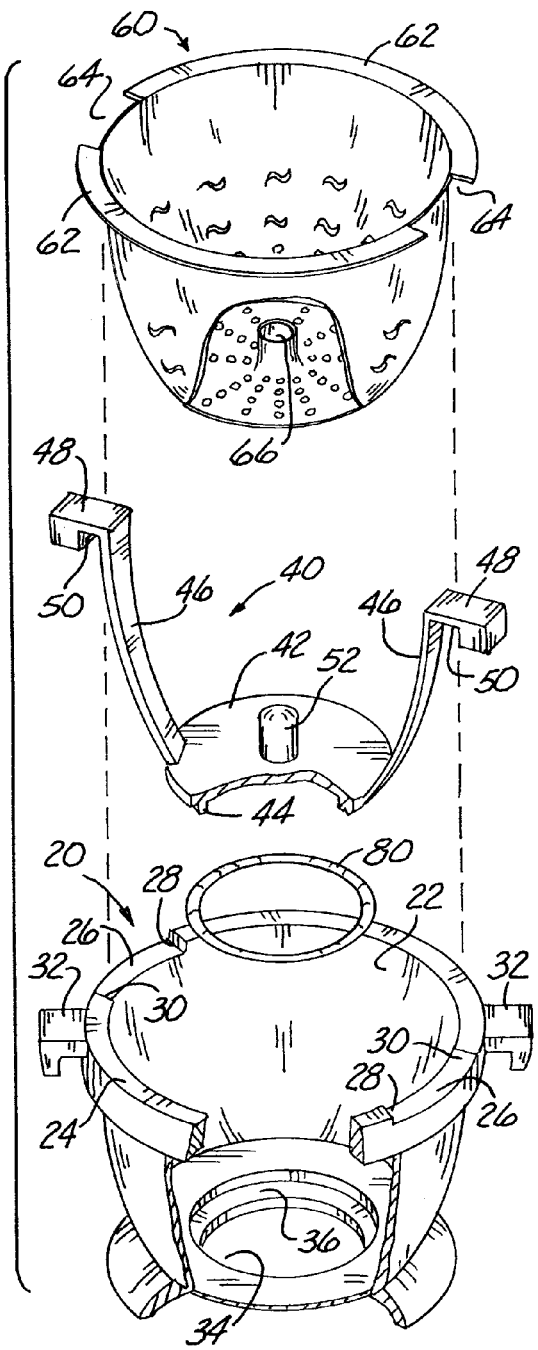
FIG. 2 is an exploded perspective view with portions cut away to show the components of the colander serving bowl.

As best shown in FIG. 2, the colander serving bowl 10 includes an outer shell 20, a movable sealing plate 40, a perforated inner shell 60, and an O-ring 80.

The outer shell 20 has an open top 22 with an outer rim 24. The rim 24 carries a pair of spaced inclined surfaces 26 with lower ends 28 and upper ends 30. A pair of handles 32 extend out from opposite sides of the rim 24. The outer shell 20 also has an open bottom 34 with a sealing ledge 36.

The movable sealing plate 40 has a base 42 with a downwardly directed sealing ring 44. A pair of arms 46 extend up from opposite sides of the base 42 and are curved to conform to the curved interior wall of the outer shell 20. Handles 48 extend out from the tops of the arms 46. Support surfaces 50 are formed on the underside of the handles 48. These support surfaces 50 are disposed to contact and be supported by the inclined surfaces 26 of the rim 24. An upwardly directed projection 62 extends from the center of the base 42.

The inner shell 80 has a number of perforations that allow draining of fluids. A flange 62 extends out from the top of the inner shell 60 and includes a pair of gaps 64 that register with the inclined surfaces 26 on the rim 24 of the outer shell 20. A central opening 66 in the bottom of the inner shell is disposed to matingly receive the projection 52 of the sealing plate 40.

Figure 3:
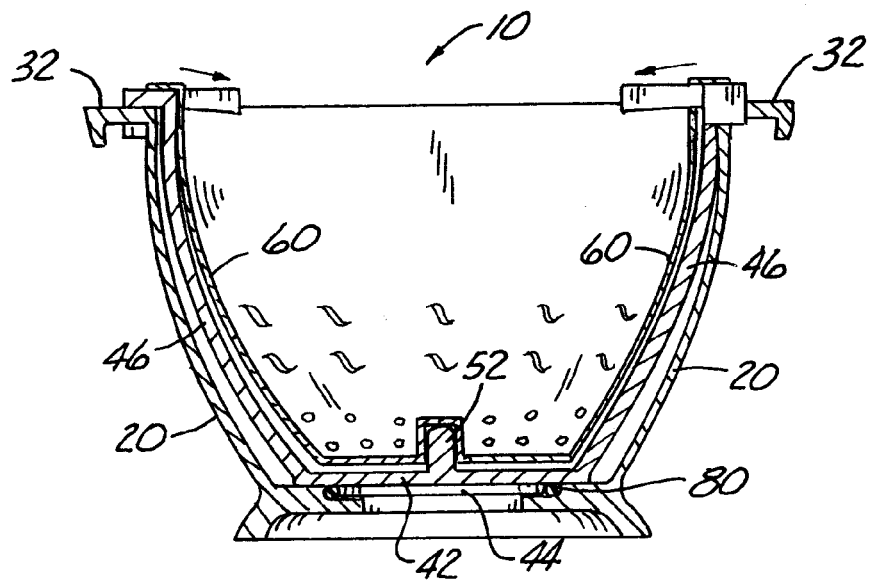
FIG. 3 is a side elevation sectional view showing the sealing plate in the lowered sealing position preventing fluids from draining.
Figure 4:
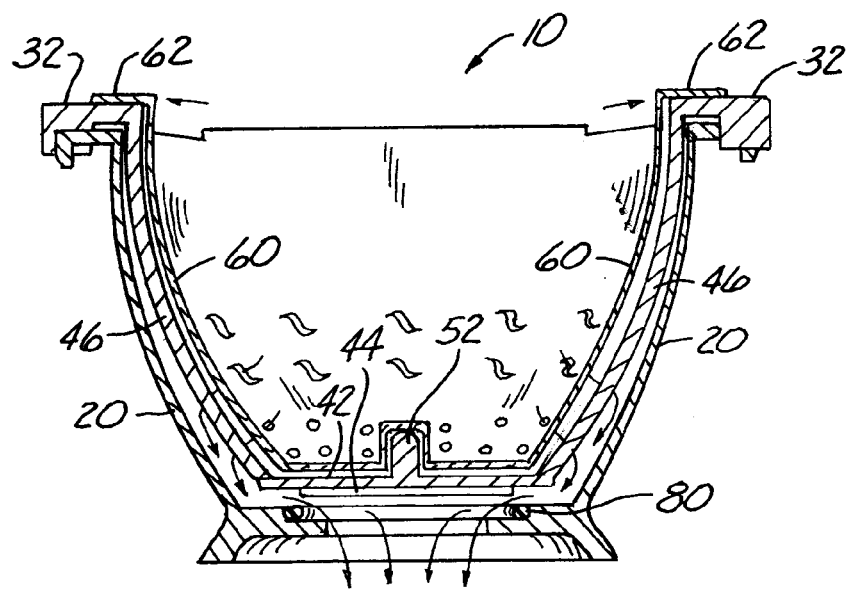
FIG. 4 is a side elevation sectional view showing the sealing plate in the raised draining position allowing fluids to drain out through the open bottom of the outer shell.

In use, the components of the colander serving bowl 10 are nested together as shown in FIG. 4. The item to be rinsed, such as fruit, vegetables, pasta, etc., is placed in the inner shell 60, and the handles 48 of the sealing plate 40 are positioned so that the support surfaces 50 contact the upper end 30 of the inclined surfaces 26. In this raised draining position (FIG. 4), fluid is allowed to pass through the open bottom 34 of the outer shell 20. When the fluid is drained, the handles 48 are moved so that the support surfaces 50 contact the lower end 28 of the inclined surfaces 26. In this lowered sealed position (FIG. 3), remaining fluid is sealed within the outer shell 20. The colander serving bowl 10 may be carried from the sink to the serving table or counter top without worries of dripping water.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A colander serving bowl, comprising:
   an outer shell having an open top with an upper rim and an open bottom with a sealing ledge;
   a movable sealing plate with a sealing ring disposed adjacent the sealing ledge of the open bottom and being movable between a lowered sealing position wherein the plate seals the open bottom, and a raised draining position wherein the plate is spaced above the open bottom; and
   a perforated inner shell received within the outer shell and being disposed to engage and be supported by the movable sealing plate;
   wherein the upper rim includes an inclined surface having a lower end and an upper end, wherein the sealing plate includes an upwardly extending support arm having a support surface disposed to engage and be supported by the inclined surface, and wherein movement of the support surface from the lower end of the inclined surface to the upper end of the inclined surface moves the sealing plate from the sealing position to the draining position.

2. The colander serving bowl of claim 1, further including an O-ring disposed between the sealing ledge of the outer shell and the sealing ring of the sealing plate.

3. The colander serving bowl of claim 2, wherein the sealing plate includes a centrally located upwardly directed projection, and wherein the inner shell includes a central opening disposed to matingly receive the projection.

4. The colander serving bowl of claim 1, wherein the upper rim includes a pair of spaced inclined surfaces each having a lower end and an upper end, wherein the sealing plate includes a pair of upwardly extending support arms each having a support surface disposed to engage and be supported by one of the pair of inclined surfaces, and wherein movement of the support surfaces from the lower ends of the inclined surfaces to the upper end of the inclined surfaces moves the sealing plate from the sealing position to the draining position.

5. The colander serving bowl of claim 4, further including an O-ring disposed between the sealing edge of the outer shell and the sealing ring of the sealing plate.

6. The colander serving bowl of claim 5, wherein the sealing plate includes a centrally located upwardly directed projection, and wherein the inner shell includes a central opening disposed to matingly receive the projection.

7. The colander serving bowl of claim 4, wherein the sealing plate includes a centrally located upwardly directed projection, and wherein the inner shell includes a central opening disposed to matingly receive the projection.

8. The colander serving bowl of claim 1, wherein the sealing plate includes a centrally located upwardly directed projection, and wherein the inner shell includes a central opening disposed to matingly receive the projection.

* * * * *